(No Model.)
A. NEWELL.
DEVICE FOR CLAMPING WHEELS OR PULLEYS UPON SHAFTS.
No. 258,797. Patented May 30, 1882.
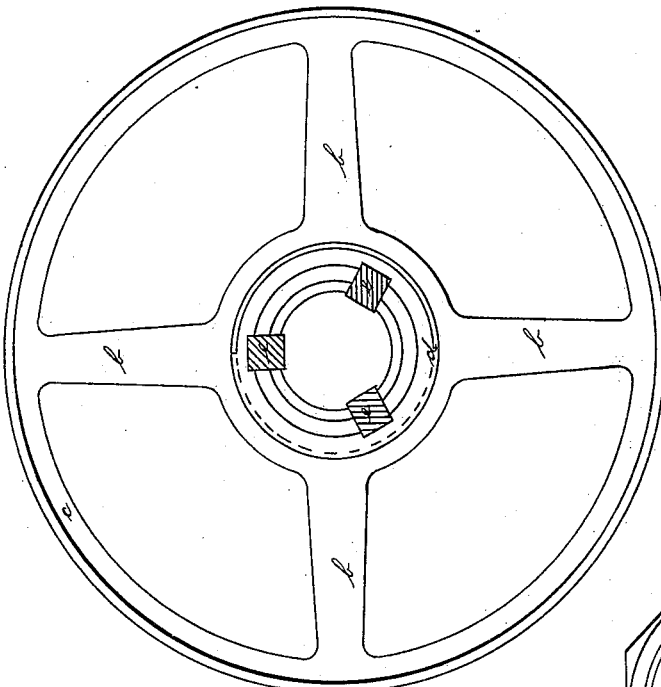
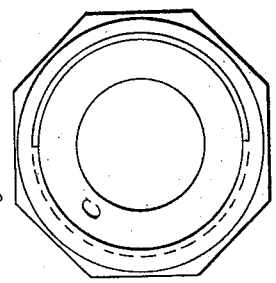
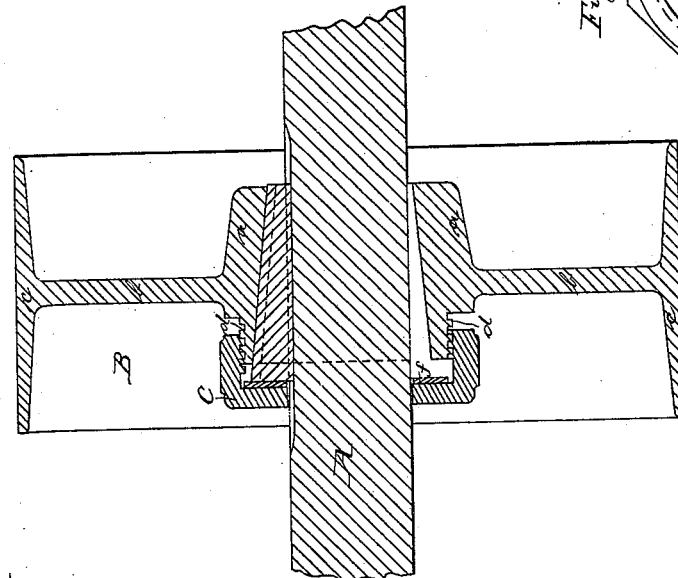
Witnesses—
H. W. Kasehagen.
F. U. Adams.
Inventor—
Augustus Newell
By Wm. H. Lotz
attorney

UNITED STATES PATENT OFFICE.

AUGUSTUS NEWELL, OF CHICAGO, ILLINOIS.

DEVICE FOR CLAMPING WHEELS OR PULLEYS UPON SHAFTS.

SPECIFICATION forming part of Letters Patent No. 258,797, dated May 30, 1882.

Application filed April 24, 1882. (No model.)

*To all whom it may concern:*

Be it known that I, AUGUSTUS NEWELL, of Chicago, in the county of Cook and State of Illinois, have invented certain new and useful Improvements in Devices for Clamping Wheels or Pulleys upon Shafts; and I do hereby declare that the following is a full, clear, and exact description thereof, reference being had to the accompanying drawings, and to the letters of reference marked thereon, which form a part of this specification.

This invention has for its object to produce a device by which to tighten the hub of a wheel or pulley upon its shaft, so as to be concentric therewith and to have a firm hold thereon independently of the exact size of such shaft; and it consists in arranging the bore of the hub of such wheel or pulley with three or more tapering grooves at equal distances apart, into which tapering keys are fitted, and with a screw-threaded annular projection for applying a clamp-nut, which will force the keys into the hub and against the shaft, all as more fully hereinafter described, and specifically claimed.

In the accompanying drawings, Figure 1 represents a section of a pulley having my improved clamping device; Fig. 2, an elevation of the same, the clamp-nut being removed; and Fig. 3, an elevation of the clamp-nut detached.

Like letters designate corresponding parts in all the figures.

A denotes the shaft, and B the pulley. This pulley has a conical hub, $a$, that is connected with rim $c$ by arms $b$. One end of hub $a$ is provided with an exteriorly-screw-threaded annular flange, $d$, for attaching a cap, C. The hub $a$ is provided internally with three radially-tapering longitudinal grooves, equally divided around the bore of such hub, that form guides and shoulders for three tapering keys, $e$, the inward faces of which are parallel with the axis of shaft A, and their thicker ends are projecting from out the annular flange $d$. The cap-nut C will force the keys $e$ uniformly into the pulley-hub, so as to bring about an equal bearing of such keys against the periphery of the shaft A, and in a manner that the face of such pulley will be always concentric with the axis of such shaft independent of the size of the same. One or more loose washers, $f$, of any suitable metal, may be interposed between the cap-nut plate and the ends of the keys, for reducing the friction.

Flat surfaces or keyways may be planed into the shaft for forming the bearing-surfaces for the keys, as shown in the drawings; but this is not essential, since a key filed or planed laterally concave on its surface that is to bear upon the shaft will give a sufficiently, sure hold for all wheels and pulleys having no extreme power to transmit.

As will be noticed, this device is cheap in its construction, and will accomplish the desired purpose by very simple means in an exceedingly satisfactory manner.

What I claim is—

1. Wheel or pulley B, having hub $a$, provided with radial longitudinally-tapering grooves, and with screw-threaded flange $d$, in combination with taper keys $e$ and clamp C, all constructed and arranged substantially as and for the purpose set forth.

2. Wheel or pulley B, having hub $a$, provided with radial longitudinally-tapering grooves for taper keys $e$, and with screw-threaded flange $d$ for clamp-nut C, and with washer $f$, all substantially as and for the purpose set forth.

In testimony that I claim the foregoing as my invention I affix my signature in presence of two witnesses.

AUGUSTUS NEWELL.

Witnesses:
F. U. ADAMS,
F. W. KASEHAGEN.